United States Patent [19]

Chelminski

[11] 4,234,052
[45] Nov. 18, 1980

[54] METHOD AND APPARATUS FOR GENERATING SEISMIC IMPULSES USING HIGH PRESSURE WATER PUMP AS THE ENERGIZING SOURCE

[75] Inventor: Stephen V. Chelminski, West Redding, Conn.

[73] Assignee: Bolt Associates, Inc., Norwalk, Conn.

[21] Appl. No.: 959,562

[22] Filed: Nov. 13, 1978

[51] Int. Cl.³ .................. G01V 1/137; G01V 1/38
[52] U.S. Cl. ...................... 181/120; 181/111; 181/113
[58] Field of Search ............. 181/119, 120, 113, 111; 367/144

[56] References Cited

U.S. PATENT DOCUMENTS

| 3,249,177 | 5/1966 | Chelminski | 181/120 |
| 3,379,273 | 4/1968 | Chelminski | 367/144 |
| 3,653,460 | 4/1972 | Chelminski | 181/120 |
| 3,808,822 | 5/1974 | Chelminski | 181/120 |
| 3,979,140 | 9/1976 | Silverman et al. | 181/120 |
| 4,131,178 | 12/1978 | Bouyoucos | 181/120 |

FOREIGN PATENT DOCUMENTS

| 487675 | 11/1976 | Australia | 181/120 |
| 2307999 | 11/1976 | France | 181/120 |
| 2308112 | 11/1976 | France | 181/120 |
| 2388284 | 4/1977 | France | 181/120 |

OTHER PUBLICATIONS

"Water Gun Fills Marine Seismic Gap", Newman, *Oil and Gas Journal*, Aug. 7, 1978, pp. 138-150.
"Simplon Water Gun, A New Implosion Type Seismic Source", Renard et al., *Offshore Technology Conf.*, Paper OTC 2017, 1974.

*Primary Examiner*—Howard A. Birmiel
*Attorney, Agent, or Firm*—Parmelee, Johnson, Bollinger & Bramblett

[57] ABSTRACT

A powerful seismic impulse is generated in a body of water by a slug of water propelled from a seismic source by expanding pressurized gas, but the gas is retained in the source for use in subsequent firings. The seismic energy source, which is called a "hydro gun", is recharged by pumping an incompressible liquid, preferably, water, at high pressure into the gun to compress the retained pressurized gas. The hydro gun includes a firing cylinder, and a piston follower in the firing cylinder divides it into a liquid-charge chamber and a gas-propulsion chamber. The liquid-charge chamber is closed from liquid discharge ports by a shuttle which is held closed by the high pressure of gas in an operating chamber. By pumping an incompressible liquid into the liquid-charge chamber, the follower is forced to compress the pressurized gas which is trapped in the gas-propulsion chamber. Then, to trigger the source, the gas pressure in the operating chamber acting on a front surface of an operating piston of the shuttle is suddenly applied to the reverse surface of the operating piston. With the shuttle thus released, the compressed pressurized gas in the gas-propulsion chamber expands against the follower to propel the liquid in the liquid-charge chamber through the liquid discharge ports into the surrounding body of water for generating a powerful seismic impulse in the water.

21 Claims, 6 Drawing Figures

FIG. 2.
FIG. 3.
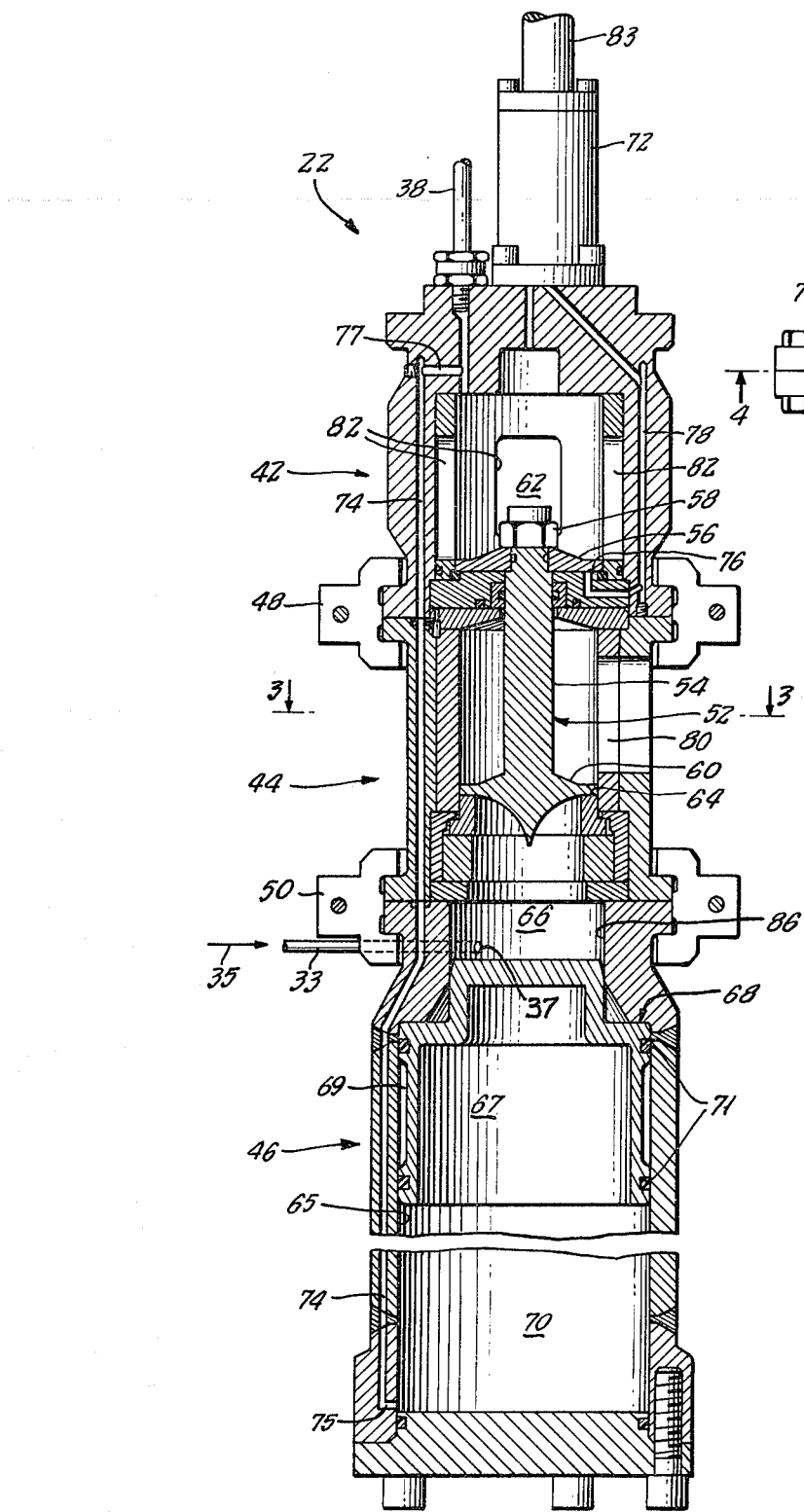
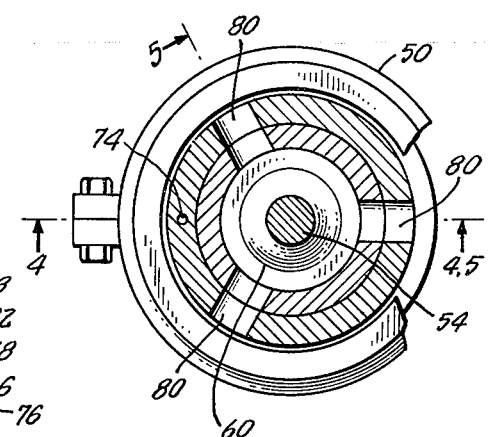

METHOD AND APPARATUS FOR GENERATING SEISMIC IMPULSES USING HIGH PRESSURE WATER PUMP AS THE ENERGIZING SOURCE

BACKGROUND OF THE INVENTION

This invention relates to marine seismic sources and more particularly to such sources in which a slug of liquid is propelled into surrounding water by an expanding volume of pressurized gas.

In seismic surveying in a body of water, air guns submerged in the water are a common means for generating seismic energy to investigate geological conditions and formations in the earth below or adjacent to the body of water. For this purpose, one or more of such air guns are submerged in the water; compressed air, or other gas or gases under pressure, is fed to the submerged guns and temporarily stored therein. At the desired instant, the air guns, the seismic energy sources, are actuated, i.e., fired, and pressurized gas, usually highly compressed air, is abruptly released into the surrounding water. In this manner powerful acoustical waves are generated, and the waves are capable of penetrating deeply into the subsurface material of the earth to be reflected and refracted therein by the various strata and formations. The reflected or refracted acoustical waves are sensed and recorded to provide information and data about the geological conditions and formations.

In order to avoid the generation of strong secondary impulses, such as can be created by the oscillating bubble of discharged air from an individual air gun, seismic energy sources known as "water guns" have recently been used. One such water gun is discussed in an article by P. Newman in the *Oil and Gas Journal,* Aug. 7, 1978, Pages 138-150. In that water gun, water is pushed from the gun by a piston propelled by expanding pressurized gas. After such a water gun is fired, the expanded pressurized gas is vented into the surrounding water over a relatively long period of time such that the discharged air does not generate any significant seismic signal which would interfere with the seismic signal generated by the propelled water. The water gun is then reset, and it is recharged by refilling the gun with pressurized air.

Both air guns and known water guns require that the gun be recharged with pressurized air (or other pressurized gas) after each firing (shot) of the gun, since the source of the energy for propelling the air or water is pressurized air which is recharged into the gun from a compressed air supply on shipboard. With each shot, or firing of the gun, a typical air gun requires the discharge of a relatively large number of cubic inches of air pressurized to for example 2,000 to 4,000 pounds per square inch. The size of the firing chambers of air guns of various sizes may range in volume upwards to several thousand cubic inches. When an array of, for example, ten to forty air guns is fired once every few seconds, the volume of air which must be compressed by the high pressure air compressors on shipboard is quite large. For example, a typical array of thirty air guns in use today may require that approximately one thousand cubic feet of air at atmospheric pressure be compressed per minute of operation during a seismic survey. To provide such a great volume of high pressure air, large air compressors are required. Such compressors occupy a substantial portion of the very limited amount of the valuable space available on board ship, and they require considerable amounts of energy to power them.

Even water guns require that a substantial amount of air be compressed to high pressures on board ship. In such seismic sources, the expanded pressurized gas must be vented into the water in order to reset the water gun. Thus, substantially the same large volume of compressed air is consumed as in the case of air guns of similar size. The above-identified article by P. Newman is entitled *Water Gun Fills Marine Seismic Gap,* and it compares the operation of a water gun with an air gun. The author states: "Operation is very similar to that of a standard air gun, in fact identical electrical firing circuits and compressed air supplies are commonly used." This statement confirms that substantially the same large volume of compressed air is consumed by water guns as by air guns of similar size.

SUMMARY OF PREFERRED EMBODIMENT

An object of the illustrative embodiment of the present invention is to provide a marine seismic energy source, which may be called a "hydro gun", in which expanding pressurized gas powerfully propels a slug of water into the surrounding water, for generating a seismic energy signal, but in which the pressurized gas, usually compressed air, is retained in the hydro gun.

Among the advantages of a hydro gun seismic surveying method and system embodying the present invention is that a large volume of pressurized air or other pressurized gas is not required to continue firing an array of such seismic energy sources. Therefore, the need for large compressor capability on board ship is obviated.

Among the further advantages of a hydro gun seismic surveying method and system embodying this invention is that each seismic energy source is energized by recharging with water fed thereto using a high pressure water pump on shipboard. Water desirably has insignificant compressibility, and for all intents and purposes herein water can be deemed to be "incompressible". Consequently, the volume of water required to be pumped by such a high pressure water feed pump is small, for it is only equal to the sum of the volumes of water discharged by the respective hydro guns. This advantageous situation with hydro guns is entirely different from the case of recharging with compressed air wherein approximately 200 cubic inches of air at atmospheric pressure must be compressed and supplied for each one cubic inch of air which is ultimately discharged or vented into the water at, say, 3,000 pounds per square inch (psi). Therefore, a relatively small and compact high pressure water pump on shipboard serves as the energizing source in contradistinction to the large bulky compressed air supplies now used for recharging air guns or water guns. Significant space and weight are saved on shipboard.

From another aspect, a hydro gun surveying method and system embodying the present invention achieves the desirable seismic energy signal characteristics of using water guns while avoiding the large consumption of compressed air as required by water guns.

In accordance with the illustrative embodiment of the invention in one of its aspects, a liquid-charge chamber in a hydro gun is held closed by the force of gas pressure against an operating piston of a reciprocatable shuttle. An incompressible liquid, e.g. water, is pumped by a small powerful high pressure pump into the charge chamber and pushes a piston follower against retained pressurized gas in a gas-propulsion chamber; the piston follower moves against the gas pressure, thereby compressing that gas. This hydro gun seismic energy source is then fired by suddenly applying this gas pressure to the reverse surface of the operating piston, so that the shuttle becomes suddenly free to accelerate under the force of the expanding compressed gas acting on the follower piston. A slug of liquid is thereby violently propelled from the liquid-charge chamber into the surrounding body of water; however, the propelling gas is retained in the hydro gun.

In accordance with another aspect of the illustrative embodiment of the invention, an equalization passage is provided between the operating chamber and the gas-propulsion chamber in order to assure a sufficiently high closing pressure on the front surface of the operating piston of the shuttle as the gas retained in the gas-propulsion chamber is compressed by recharging of high pressure water into the liquid-charge chamber.

According to yet another aspect of the illustrative embodiment of this invention, the portion of the shuttle adjacent the liquid-charge chamber includes a pseudoconical or cusped surface that redirects the axially flowing liquid discharge out radially through the discharge ports.

In accordance with yet another aspect of the illustrative embodiment of the invention, the follower piston is a cup-shaped piston member which assures that a sufficient volume of pressurized gas is retained immediately adjacent to the piston follower for producing a powerful firing action of the hydro gun after the gas is compressed in the gas-propulsion chamber.

In accordance with a further aspect of the illustrative embodiment of this invention, the piston follower has a reduced diameter top portion directed toward gas discharge ports, and the liquid-charge chamber tapers into a reduced diameter throat in the region adjacent to the discharge ports. Consequently, when this seismic energy source is fired, water outside of the reduced diameter portion of the follower piston becomes trapped to damp the high speed forward driving movement of the piston.

In the use of a hydro gun array, there will be a small air compressor on shipboard for the purpose of resupplying the small amount of air which is released from the firing vent orifice of each gun during the brief instant when the guns are fired.

As used herein the term "pressurized gas" is intended to be interpreted sufficiently broadly to include compressed air which is shown as being used in the preferred embodiment.

It is also possible to string or submerge one or more arrays of hydro guns embodying the present invention in marshland, swamp or mud areas which are infused with sufficient water that hydro guns can be used effectively. Accordingly, the terms "water", or "body of water" and the terms "towing vessel", "ship", as well as "marine seismic surveying", as used in the specification and claims are intended to be interpreted sufficiently broadly to include these marginal applications of the present invention.

BRIEF DESCRIPTION OF THE DRAWINGS

The foregoing and other objects, features, aspects and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

FIG. 2 is a sectional elevational view of a single hydro gun embodying the present invention and shown on enlarged scale as compared with FIG. 1;

FIG. 3 is a cross-sectional view of the hydro gun of FIG. 2 taken along line 3—3 looking downwardly;

DESCRIPTION OF A PREFERRED EMBODIMENT

Figure 1:
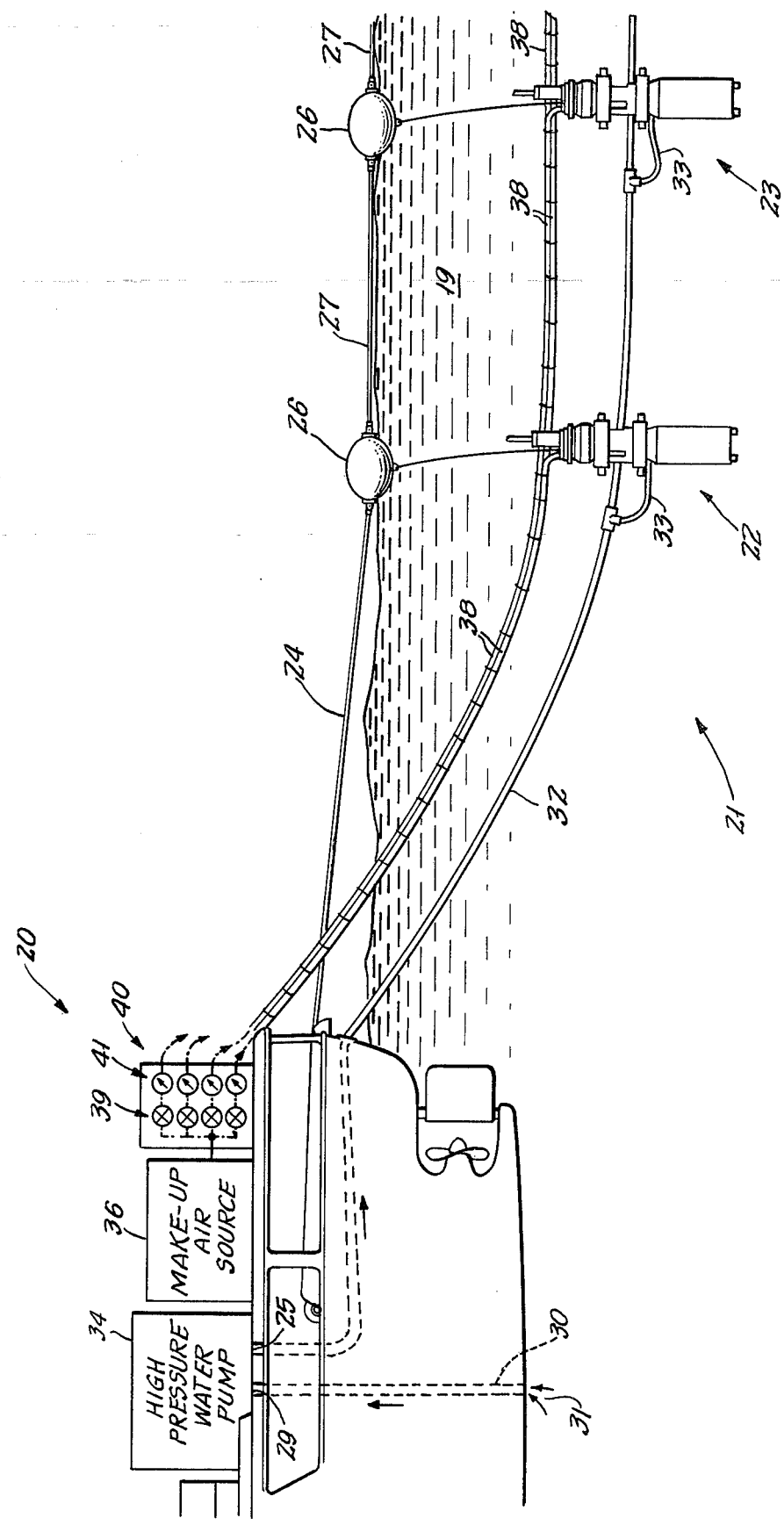
FIG. 1 is a pictorial illustration of a seismic survey vessel towing an array of hydro guns, two guns being shown.

As shown in FIG. 1, a survey vessel 20 on a body of water 19 tows a streamer array 21 of hydro guns, including guns 22 and 23, by a tow line 24 extending from the vessel 20. It is to be understood, for example, that this array 21 may include two to thirty or more of the hydro guns 22, 23 etc. The tow line 27 interconnects buoys 26, there being one buoy for supporting each hydro gun. Other arrangements as known in the art for towing a multiplicity of marine seismic energy sources may be used for towing these hydro guns, for example, streamer apparatus may be used similar to that which is shown in U.S. Pat. No. 4,038,630, issued July 26, 1977.

Sea water 31 is drawn through an intake line 30 into the intake 29 of a high pressure water pump 34 having its outlet 25 connected to the high pressure water feed line 32. The sea water is pumped at high pressure into each hydro gun through the recharging feed line 32 by the high pressure water pump 34. A single feed line 32 is shown extending along the array and is connected by in-feed branch lines 33 to the respective hydro guns in the array, and each hydro gun is automatically recharged with high pressure water 35 (FIG. 2) after each firing. The water enters the interior of the hydro gun through an inlet port 37. The high pressure water pump 34 is a positive displacement pump having a pressure relief valve as will be understood, connected to the outlet of the pump 34 for assuring that the pressure of the water in the high pressure recharging line 32 does not exceed a predetermined limit. For example, the hydro guns may be arranged to be charged with water up to a pressure of approximately 3,000 psi, in which case the pressure relief valve is set at a level of approximately 3,000 psi; however, greater or lesser operating pressures may be used, as may be desired by the survey team.

For initially supplying each hydro gun with its retained pressurized air and for making up any small amounts of pressurized air which becomes released during firing through the small firing vent orifice (not shown) discussed below, there is a make-up air source 36. This air source 36 is connected to the respective hydro guns by a plurality of make-up supply lines 38 extending from the vessel 20. The make-up air source 36 includes a relatively small and compact high pressure air compressor for providing a low volume of pressurized gas at the desired high pressure.

There is a control console 40 including shut-off valves 39 and pressure-indicating meters 41 for the respective make-up lines 38. The pressure of the compressed gas occurring in any particular one of the hydro guns during an operating cycle can be determined by shutting off the respective valve 39 for isolating the particular line 38 extending from the source 36 to that particular gun. After this particular line 38 has been isolated from the source, the meter 41 for that isolated line will indicate the gas pressure in the hydro gun during an operating cycle. Also, the shut-off valves 39 can be used for shutting off the supply of make-up air from any hydro gun which malfunctions or misfires or leaks.

The hydro guns 22, 23, etc. are triggered so as to be fired by triggering arrangements similar to the known triggering arrangements used for air guns by electrical trigger impulses transmitted through an electrical cable 83 (FIG. 2) to the solenoid-controlled valve 72 from a central on-board electronic control system.

The hydro guns in the array 21 are shown as being identical, and one of those guns, gun 22, is shown in section in FIG. 2. The hydro gun 22 includes three sections, the operating chamber section 42, the discharge port section 44, and a firing chamber section 46. These sections are united to form a single unit by removable clamps 48 and 50.

The firing chamber 65 in firing chamber section 46 is divided into an upper liquid-charge chamber 66 and a lower gas-propulsion chamber 70 by a cup-shaped piston follower 68. The liquid-charge chamber 66 is closed by action of a reciprocatable shuttle 52, which includes a central shaft 54, an upper operating piston element 56, and a lower piston element 60. The upper operating piston element 56 is secured onto the shaft 54 by a lock nut 58, and this upper piston 56 rides in an operating chamber 42 and controls discharge of the hydro gun. The lower piston element 60 normally rests against a seat 64 to close the liquid-charge chamber 66. As will be described subsequently, the shuttle 52 is actuated by a solenoid-controlled valve 72 mounted to the top of the hydro gun.

Make-up pressurized gas which has been fed through the line 38 is stored and is retained in the operating chamber 62. The gas also has access through an equalization passage 74 to be stored and retained in the gas-propulsion chamber 70. High pressure recharging water is pumped into the liquid-charge chamber 66 through the branch line 33 and serves to compress further the pressurized gas, as will be explained.

In operation, the operating piston 56 of shuttle 52 initially rests against a seat 76 and is held there by the pressurized gas in the operating chamber 62, such gas pressing downwardly on the front (upper) face of the operating piston 56. With the shuttle 52 in this lowermost position, the lower piston element 60 also initially rests against the seat 64 to close the liquid-charge chamber 66. Then, high pressure water 35 is pumped into the liquid-charge chamber 66 through the line 33, this water being noncompressible and being driven by the pump 34 which is capable of feeding the water 35 at a higher pressure than the initial pressure of the pressurized air in the gas-propulsion chamber 70. The entering water 35 pushes the piston follower 68 downwardly against the force of the pressurized gas in gas-propulsion chamber 70, thereby further compressing the pressurized air (or other pressurized gas) therein. The follower 68 moves steadily downwardly as high pressure water 35 is introduced into the liquid-charge chamber 66 until the follower 68 reaches a lowermost position as shown in FIG. 4.

As the follower piston 68 is driven steadily downwardly by the entry of high pressure water 35 into the liquid-charge chamber 66, the pressurized gas which is retained and stored in the gas-propulsion chamber 70 becomes steadily compressed to a higher-and-higher pressure. As this pressure in the gas-propulsion chamber 70 becomes steadily increased, some of the gas flows upwardly through the pressure-equalization passage 74 which communicates at 75 with the lowest region in the propulsion chamber 70 and communicates at 77 with the top of the operating chamber 62. Thereby, the pressure in the operating chamber 62 also steadily increases to remain equalized with that in the propulsion chamber 70. Consequently, the operating piston 56 remains held firmly seated against its seat 76 as the pressures in chambers 70 and 62 are both increasing.

Considering the dynamic action occurring during recharging by the high-pressure water, it is to be noted that the area of the upwardly facing surfaces of the piston follower 68 is equal to the area of its downwardly facing surfaces. Thus, the piston follower 68 moves within the liquid-charge chamber 66 to maintain substantially equal fluid pressures in the liquid-charge chamber 66 and in the gas-propulsion chamber 70 as the follower piston 68 is driven downwardly by the entry of the recharging water 35. The liquid-charge chamber 66 becomes increased in volume, and the gas-propulsion chamber 70 becomes reduced in volume as the follower piston moves downwardly in a stroke which may be called its energizing stroke. The effect is like hydraulically cocking an enormously powerful spring, with the trapped gas in the chamber 70 acting like the powerful spring. The gas-propulsion chamber 70 is equalized in pressure with the operating chamber 62 through the equalization passage 74. Thus, the upwardly acting pressure (force per square inch) on the lower surface of the piston element 60 of shuttle 52 is equal to the downwardly acting pressure on the upper face of the operating piston 56. However, the diameter and hence the active area (exposed surface) of the operating piston 56 is somewhat greater than the diameter and hence the active area (exposed surface) of the lower piston element 64; thus, the downward force on the shuttle 52 exceeds the upward force. Consequently, the shuttle is held in its seated position, and the liquid-charge chamber 66 thus remains closed even as liquid is pumped into it and as the piston follower 68 moves downwardly to compress the pressurized gas in the gas-propulsion chamber 70.

Figure 4:
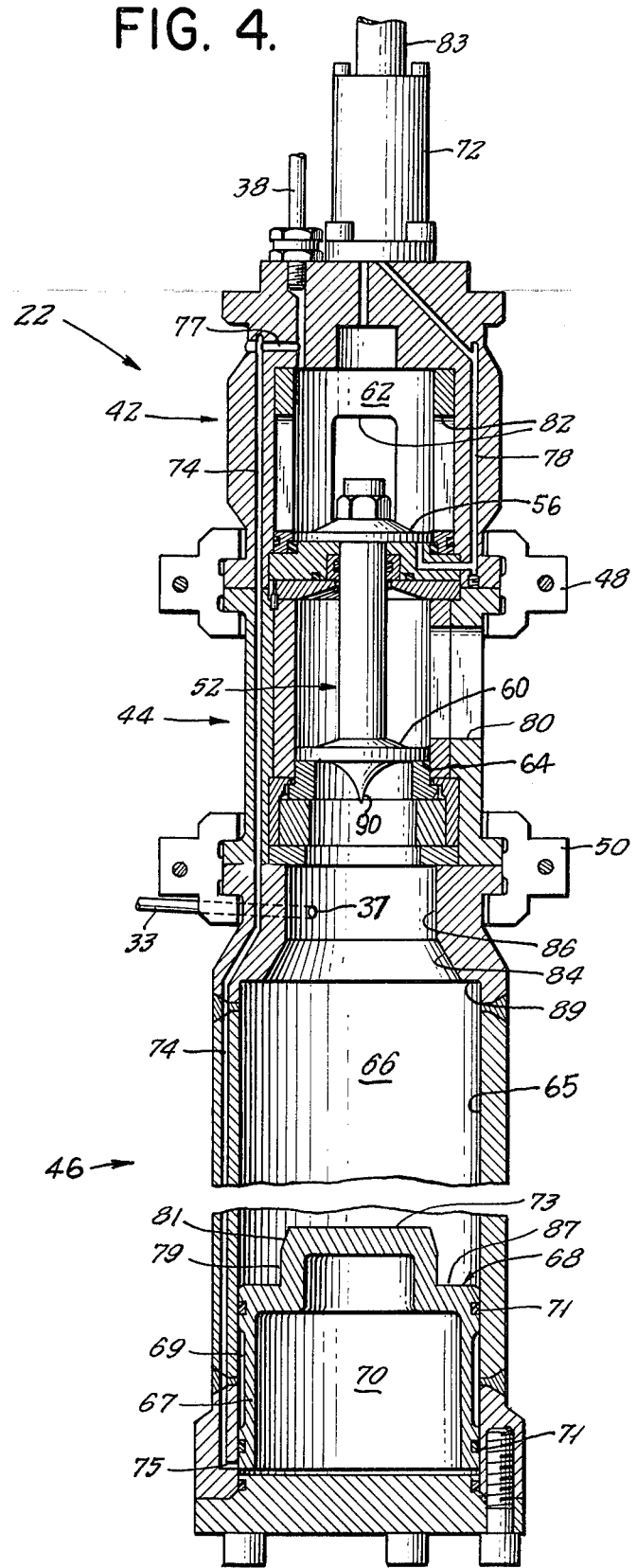
FIG. 4 is an elevational sectional view similar to FIG. 2, taken along line 4—4 in FIG. 3, but showing the piston follower moved into the charged gun position as the result of recharging the hydro gun by high pressure water pumped into the liquid-charge chamber.

The piston follower 68 is in the shape of an inverted cup so that, even when in its lowermost position as shown in FIG. 4, there is a sufficient volume of compressed gas below the piston follower for powerfully propelling the slug of water from the liquid-charge chamber when the hydro gun is fired. O-rings 71 provide the desired sliding seal between the liquid-charge chamber 66 and the gas-propulsion chamber. These O-rings 71 encircle the skirt portion 67 of the piston follower, near the top and bottom thereof, respectively. The skirt 67 is reduced in thickness and weight by a broad, shallow channel 69 located between these O- rings. A lubricant may be retained in this broad channel 69 to act as a semi-permanent lubrication source for the piston follower 68.

In order to provide a shock-absorbing damping effect for the piston follower 68 at the end of its expulsion stroke as will be explained further below, there is a centrally located and axially protruding piston top portion 73 (FIG. 4) on the piston follower. The diameter of the cylindrical side wall 79 of this reduced diameter piston top 73 is sized to fit with clearance within the throat region 86 of the liquid-charge containing chamber 66. A tapered region 81 of the side wall 79 is contiguous with the top surface of the piston top 73.

Once the piston follower 68 has moved to its lowermost position as shown in FIG. 4, the hydro gun remains static until a trigger signal is transmitted through an electrical cable 83 to the solenoid valve 72. At that time, pressurized gas from the operating chamber 62 is free to flow through the solenoid valve 72 and through a trigger passage 78 to the region below the lower face of the operating piston 56. The upward force applied to the operating piston 56 by the pressurized gas flowing through this trigger passage 78 causes the resultant forces on the shuttle to act upwardly so that the shuttle 52 jumps suddenly upwardly. The by-pass channels 82 permit the operating piston 56 to travel upwardly at great velocity.

The lower piston element 60 is initially seated on the seat 64 located a substantial distance below the liquid discharge ports 80 so that the operating piston 56 reaches by-pass channels 82 before the liquid-charge chamber 66 becomes opened to the liquid discharge ports 80. Consequently, the shuttle can accelerate rapidly upwardly to suddenly open the liquid-charge chamber 66 to the liquid discharge ports 80. The compressed pressurized gas in the gas-propulsion chamber 70 acting like a powerful spring expands rapidly, forcing the piston follower 68 upwardly to abruptly push the slug of water 35 which was previously stored in the liquid-charge chamber 66 out through discharge ports 80, as shown in FIG. 5.

The reduced diameter top portion 73 of the piston follower 68 moves upwardly into the throat portion 86 of the liquid-charge chamber 66. This traps a quantity of water in the annular region 88 of the liquid-charge chamber 66 surrounding the side wall 79 of the piston top 73. This trapped water 88 acts as a shock-absorber to damp the upward movement of the piston follower 68 to reduce the mechanical shock to the water gun as the piston follower 68 is smoothly brought to a halt, by the trapped water 88 being ejected upwardly as shown at 85 between the sloping surface 81 on the piston top 73 and the converging neck 84 below the throat 86 of the chamber 66.

Figure 5:
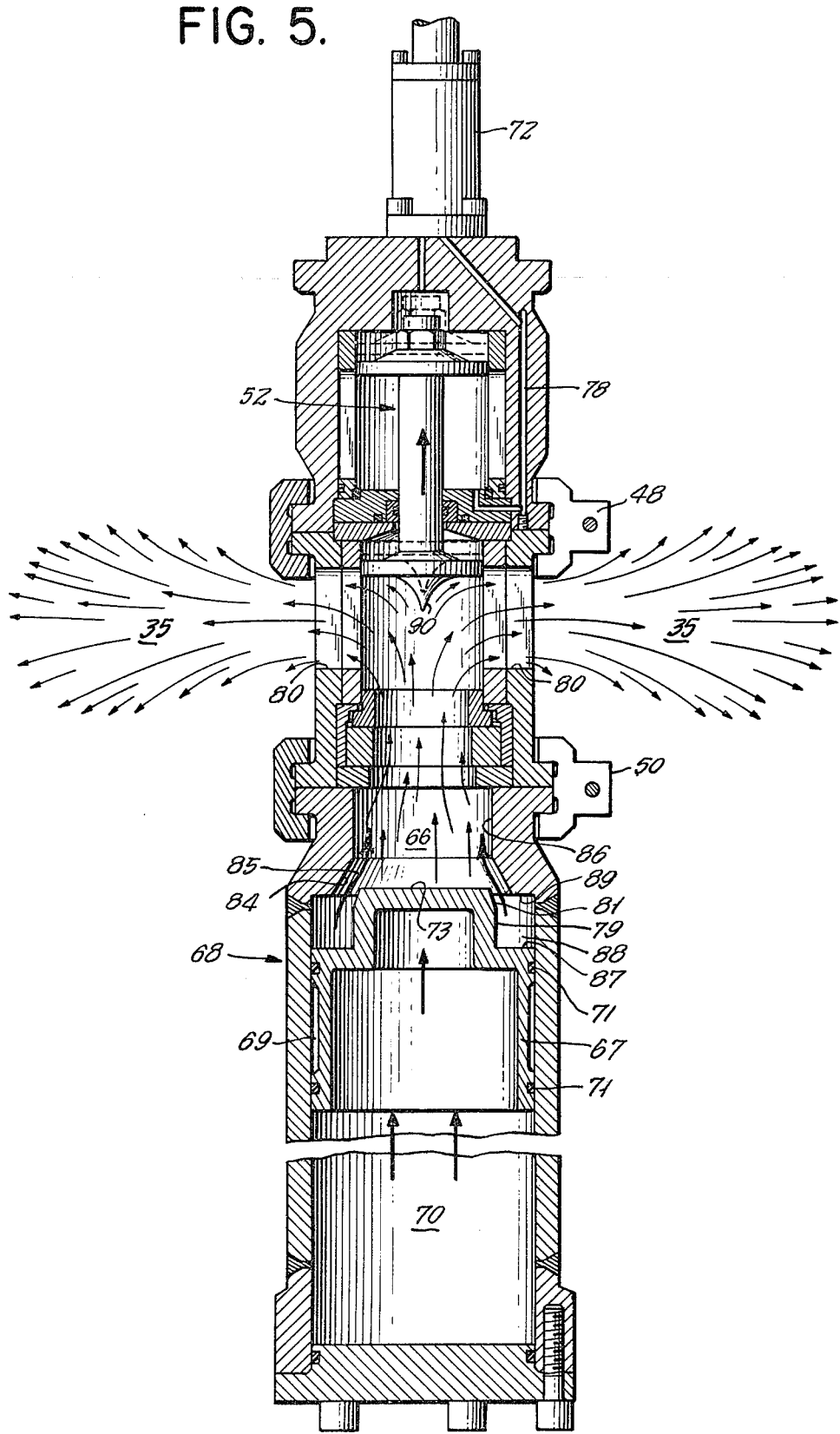
FIG. 5 is an elevational sectional view taken along line 5—5 in FIG. 3 and showing a slug of water being discharged by means of trapped pressurized gas expanding upwardly pushing the piston follower upwardly.

It will be noted, primarily in FIG. 5, that the lower surface of the lower piston element 60 of the shuttle 52 has a downwardly pointed pseudoconical shape or cusp 90 which is concentrically positioned for redirecting the axially flowing mass of liquid from the liquid-charge chamber 66 radially outwardly through the three liquid discharge ports 80. This cusp surface 90 reduces turbulent losses in the liquid flow and thereby provides for increased velocity in the sudden ejection of the slugs of water 35 outwardly through the ports 80. The momentum of the high velocity of each slug of water 35 (FIG. 5) carries it outwardly, leaving a void in the ambient body of water 19 (FIG. 1) near the respective liquid discharge port 80. The surrounding water 19, being under hydrostatic pressure, then flows inwardly to fill that void. A powerful seismic impulse is generated when the void collapses, and it is a strong and discrete acoustical impulse.

The gas in the chamber 70, which acted like a powerful spring in driving the follower piston 68 upwardly in what may be called the ejection stroke, is confined behind this follower piston and cannot escape through the ports 80.

After the hydro gun has fired as shown in FIG. 5, the liquid pressure acting upwardly on the lower piston 60 of the shuttle 52 is reduced to ambient hydrostatic pressure. The confined gas in the operating chamber 62 is still at a high pressure, and thus the shuttle is returned to its initial position with the operating piston 56 returning down onto its seat 76. The hydro gun is thus reset and may be reenergized by pumping high pressure water through line 33 (FIG. 2) into the liquid-charge chamber 66.

It will be noted that, except for the small amount of air, as mentioned before, which is released out during firing through the small firing vent orifice, there is no loss of pressurized gas from each hydro gun during firing or recharging of the gun. The firing vent orifice (not shown) communicates with the trigger passage 78 to bring the pressure beneath the operating piston 56 back to ambient hydrostatic pressure when the operating piston is reseated after each firing cycle of the hydro gun 22. Ideally, even with a long sequence of firings of the hydro gun, only a comparatively small amount of pressurized gas need be provided to the operating chamber 62 or to the gas-propulsion chamber 70 once the gun has received its initial charge of pressurized gas, such a minimal amount of make-up gas being provided through lines 38.

Turning attention to the liquid-charge chamber 66 and the gas-propulsion chamber 70, it is to be noted that both of these chambers are cylindrical; they are axially aligned; and they have the same diameter. Each chamber forms an axial extension of the other chamber so that the piston follower 68 can slide smoothly with minimal friction between them, thereby increasing the volume of one while decreasing the volume of the other, and vice versa.

Figure 6:
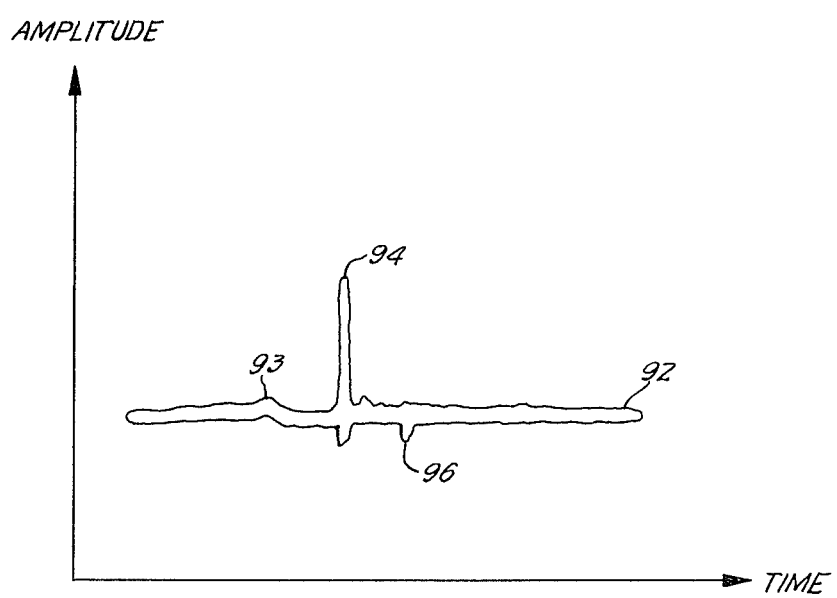
FIG. 6 graphically demonstrates the operating results of a water gun embodying the present invention.

The results of using the above-described hydro gun seismic energy source are demonstrated by the plot 92 shown in FIG. 6. This plot 92 is a copy of a photographic print made from an oscillograph readout produced by firing a hydro gun having a liquid-charge-containing chamber 66 of 60 cubic inches volume when measured with the follower piston 68 in its lowermost position as shown in FIG. 4. The gas pressure in the propulsion chamber 70 was approximately 2,200 psi (gage pressure) measured when the follower piston 68 is in its initial uppermost position as shown in FIG. 2. The pressure variation at 93 is caused by the discharge of the water 35 into the surrounding body of water as shown in FIG. 5. The spike-like peak 94 of the seismic signal plot 92 has a peak amplitude of 4 barmeters. The measurements were made using a hydrophone positioned 45 feet directly below the hydro gun, i.e. at a depth of 75 feet below the surface, in the so-called "far field" region in the body of water surrounding the hydro gun. The horizontal time scale for the plot in FIG. 6 is 10 milliseconds per centimeter. The hydro gun was fired at a depth of 30 feet below the surface of the body of water. It is interesting to see the desirably abrupt rise and sharp peak of the seismic signal pulse 94 and to note that there is almost a complete absence of any secondary signals. The negative-going pulse 96 which was received by the hydrophone approximately 10 milliseconds after the original signal 94 is the result of reflection of the original signal pulse from the surface of the body of water. Such a reflection occurs with a 180° phase shift, thereby producing a negative-going pulse 96 as seen.

With only a low volume of make-up pressurized gas needed for continued firing of the hydro gun, the bulky, large multi-stage high pressure air compressors necessary to energize past air guns and water guns are eliminated. Instead, because water is substantially incompressible, a relatively small high pressure pump can provide the relatively small volume of water 35 at high pressure to recharge and energize the water guns at each firing.

It is to be noted that in FIGS. 1, 2 and 4, the water in-feed line 33 is shown connected to the firing chamber section 46 of the hydro gun 22 or 23 at a point which is located generally near the central portion of the gun. It is my presently preferred mode of practicing the invention to connect the line 33 to the top of the hydro gun near the make-up air line 38, because the line 33 is then farther away from the discharge ports 80. Then, there is a second drilled passage (not shown) similar to the passage 74. This second passage extends down from the line 33 to the inlet port 37 where the high pressure water enters the liquid-charge chamber 66.

Although a single, common high pressure water line 32 is shown in FIG. 1, for recharging all of the hydro guns, it is to be understood that an individual line may extend from the vessel 20 to each hydro gun. In that case a shut off valve may be associated with each of the individual water feed lines for shutting off the supply to any particular hydro gun in the array, if desired.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. A method for generating a powerful seismic impulse in a body of water comprising the steps of:
  applying gas pressure in an operating chamber to an operating piston of a reciprocatable shuttle for moving the shuttle to close a charge chamber from at least one liquid discharge port;
  pumping a substantially incompressible liquid into said charge chamber to push a piston follower into an energized piston against pressurized gas in a gas-propulsion chamber for compressing that pressurized gas, and subsequently
  equalizing the gas pressure on opposite sides of said operating piston for suddenly moving said shuttle into an open position for causing said incompressible liquid to be forced abruptly through said liquid discharge port by said piston follower being driven forwardly from said energized position toward said port by the compressed pressurized gas expanding in said gas-propulsion chamber, and
  retaining said pressurized gas in said operating chamber and in said gas propulsion-chamber after said expansion has occurred.

2. The method of generating a powerful seismic impulse in a body of water as claimed in claim 1, including the steps of:
  maintaining the gas pressures in said operating chamber and in said gas-propulsion chamber approximately equal by providing continuous communication between said gas-propulsion chamber and said operating chamber.

3. The method of generating a powerful seismic impulse in a body of water as claimed in claim 1, including the steps of:
  damping the forward movement of said piston follower near the end of its forward stroke by temporarily trapping water around a top portion of the piston follower and ejecting the water through a restricted space for smoothly halting the forward movement of the piston follower.

4. The method for generating a sequence of abrupt powerful seismic signal impulses in a body of water in which a gun-type seismic energy source submerged in the water is employed wherein gas pressure in an operating chamber is applied to a first surface of a reciprocatable shuttle for holding the shuttle in an initial closed position for causing the shuttle to block access from a firing chamber to at least one discharge port for preventing the contents of said firing chamber from escaping through said discharge port, and wherein the gas pressure in the operating chamber is thereafter suddenly applied to a second surface of the reciprocatable shuttle for permitting the sudden movement of the shuttle to an open position in which said firing chamber communicates with the discharge port for permitting the contents of said firing chamber suddenly to escape through said discharge port for generating seismic energy in the water, said method comprising the steps of:
  providing the firing chamber as an elongated cylindrical chamber;
  providing a freely movable piston follower in said cylindrical chamber for dividing the cylindrical chamber into a charge chamber located on the side of said piston follower facing toward the discharge port and a gas-propulsion chamber located on the opposite side of said piston follower, with said piston follower being movable forwardly in said cylinder to an uppermost position at which said charge chamber has its minimum size and said gas-propulsion chamber has its maximum size and also being movable downwardly to a lowermost position at which said charge chamber has its maximum size and said gas-propulsion chamber has its minimum size;
  initially supplying gas at a pressure of at least 1,000 pounds per square inch to said source, applying gas pressure in said operating chamber to the first surface of said reciprocatable shuttle for holding the shuttle in said closed position and supplying gas at a pressure of at least 1,000 pounds per square inch into said gas-propulsion chamber for moving said piston follower forwardly to said uppermost position;
  pumping water at high pressure into said charge chamber for filling said charge chamber and for pushing said piston follower downwardly to its lowermost position for compressing the pressurized gas in said gas-propulsion chamber;
  applying gas pressure to the second surface of said operating piston for permitting the sudden movement of the shuttle to its open position for allowing the compressed pressurized gas in said gas-propulsion chamber suddenly to expand for pushing the piston follower forwardly to its uppermost position for forcefully propelling the water from said charge chamber through said discharge port into the surrounding water for generating a powerful seismic impulse in the body of water;

retaining the pressurized gas in said gas-propulsion chamber and in said operating chamber after said sudden expansion has occurred and allowing the retained pressurized gas to return the shuttle to its closed position;

again pumping water at high pressure into said charge chamber for re-filling said charge chamber and for again pushing said piston follower downwardly to its lowermost position for compressing retained pressurized gas in said gas-propulsion chamber; and repeating steps of said sequence for generating the sequence of abrupt powerful seismic signal impulses in the body of water.

5. A method of generating a sequence of abrupt powerful seismic impulses in a body of water as claimed in claim 4, including the steps of:

maintaining the pressure of the gas in said operating chamber approximately equal to the pressure of the gas in said gas-propulsion chamber during each compression of the pressurized gas in said latter chamber while said piston follower is being pushed downwardly to its lowermost position by the pumping of the water at high pressure into said charge chamber.

6. A method for generating a sequence of abrupt powerful seismic impulses in a body of water as claimed in claim 5, including the steps of:

providing communication between said gas-propulsion chamber and said operating chamber for allowing gas to flow from said gas-propulsion chamber into said operating chamber during said downward pushing of said piston follower.

7. A method for generating a sequence of abrupt powerful seismic impulses in a body of water as claimed in claim 4 or 5, including the step of:

damping the forward movement of the piston follower near the uppermost limit of its forward stroke by temporarily trapping water around said piston follower and ejecting the trapped water through a confined space.

8. A seismic source adapted to be submerged in water and to propel a slug of liquid into the water by means of expanding pressurized gas while minimizing the loss of pressurized gas from said source, said seismic source comprising:

a firing chamber;

a follower in said firing chamber dividing said firing chamber into a liquid discharge chamber and a gas-propulsion chamber;

at least one liquid discharge port at one end of said liquid charge chamber opposite to said follower;

an operating chamber;

a reciprocating shuttle for closing said liquid charge chamber from said liquid discharge port when in a first position, said shuttle having a shaft extending into said operating chamber and having an operating piston in said operating chamber;

liquid supply means for supplying a substantially incompressible liquid into said liquid charge chamber;

pressurized gas supply means for supplying high pressure gas to said operating chamber and said gas-propulsion chamber; and control means for equalizing the gas pressure on opposite sides of said operating piston, whereby said seismic source is charged by pumping said incompressible liquid through said liquid supply means into said liquid charge chamber, while said liquid charge chamber is closed by gas pressure on said operating piston, said incompressible liquid pushing against said follower to compress gas in said gas-propulsion chamber, and whereby said seismic source is fired by equalizing the gas pressure on opposite sides of said operating piston so that said shuttle is accelerated into its open position with said incompressible liquid being forced through said liquid discharge ports by said compressed pressurized gas expanding in said gas-propulsion chamber, said pressurized gas being retained in said gas-propulsion chamber and said operating chamber during and subsequent to firing of said seismic source.

9. A seismic source as claimed in claim 8, wherein said control means for equalizing the gas pressure on opposite sides of said operating piston includes a solenoid controlled valve and a trigger channel.

10. A seismic source as claimed in claim 8, wherein the surface of said reciprocating shuttle facing said liquid charge chamber has a pseudoconical shape for directing axially propelled water radially through said liquid discharge port.

11. A seismic source as claimed in claim 8, wherein said follower is a piston.

12. A seismic source as claimed in claim 11, wherein said piston follower is in the shape of a cup with its closed end directed toward said liquid discharge port.

13. A seismic source as claimed in claim 11, in which a reduced diameter portion of said liquid charge chamber receives a reduced diameter portion of said piston follower to damp movement of said piston during firing.

14. A seismic source as claimed in claim 8, further comprising a gas pressure equalizing passage interconnecting said operating chamber and said gas-propulsion chamber.

15. In a gun-type seismic energy system wherein a gun-type seismic source is submerged in a body of water and gas pressure in an operating chamber of the gun-type source is applied to a first surface of a reciprocatable shuttle for holding the shuttle in an initial closed position for causing the shuttle to block access from a firing chamber to a discharge port for preventing the contents of said firing chamber from escaping through said discharge port, and wherein the holding action of the gas pressure is released from the shuttle by actuating means for permitting the sudden movement of the shuttle to an open position in which said firing chamber communicates with the discharge port for permitting the contents of said firing chamber suddenly to escape through said discharge port for generating seismic energy in the water, the invention of a hydro gun system comprising:

an elongated cylindrical member defining said firing chamber;

a freely movable piston follower in said cylindrical member dividing the firing chamber into a charge chamber located on the side of said piston follower facing toward the discharge port and a gas-propulsion chamber located on the opposite side of said piston follower;

said piston follower being freely movable upwardly in said cylindrical member to an upper position and also being movable downwardly to a lower position in which said charge chamber is enlarged in volume while said gas-propulsion chamber is reduced in volume as compared with their respective volumes when said piston follower is in said upper position;

means for supplying pressurized gas into said gas-propulsion chamber for moving said piston follower to said upper position;

high pressure water pump means having an intake communicating with the body of water for causing water to enter into the pump and having an outlet connected through a high pressure water line to said charge chamber for feeding high pressure water into said charge chamber for filling said charge chamber with water and thereby to drive said piston follower downwardly to said lower position for further compressing the pressurized gas in said gas-propulsion chamber;

whereby the compressed pressurized gas in said gas-propulsion chamber can suddenly expand for suddenly pushing the piston follower upwardly to said upper position upon release of the holding action from said shuttle for forcefully propelling the water from said charge chamber out through said discharge port into the surrounding water for generating a powerful seismic impulse in the body of water; and said piston follower in said upper position preventing the expanded pressurized gas in said gas-propulsion chamber from flowing out through said discharge port.

16. In a gun-type seismic energy system, the invention of a hydro gun system as claimed in claim 15, in which:

the hydro gun has radially oriented discharge ports spaced uniformly one from another and each positioned at the same distance from the piston follower; and the surface of said shuttle facing toward said charge chamber has a generally conical configuration with a relatively sharp point in the center thereof for directing out through said multiple ports the water being forcefully propelled in an axial direction by said piston follower.

17. In a gun-type seismic energy system, the invention of a hydro gun system as claimed in claim 15, in which:

said piston follower is generally inverted cup-shaped having its hollow interior facing downwardly toward and communicating with said gas-propulsion chamber.

18. In a gun-type seismic energy system, the invention of a hydro gun system as claimed in claim 15, 16 or 17 in which:

said charge chamber has a throat region of smaller diameter than the remainder of said charge chamber, said throat region leading from said charge chamber toward said discharge port;

said piston follower has a centrally located upwardly protruding piston top portion of reduced diameter having a cylindrical side wall sized to fit with clearance within said throat region for trapping water in the annular space around said piston top portion as the piston top portion enters said throat region, for damping the sudden upward motion of the piston follower as the piston follower nears said upper position.

19. In a gun-type seismic energy system, the invention of a hydro gun system as claimed in claim 18, in which:

said piston follower has an external shoulder thereon below said cylindrical side wall of the piston top portion;

said firing chamber has an internal shoulder below said throat region; and said external shoulder of the piston follower acts as a stop coming into contact with said internal shoulder when said piston follower is in said upper position.

20. In a gun-type seismic energy system, the invention of a hydro gun system as claimed in claim 19, in which:

there is a converging neck leading from said internal shoulder to said throat region; and said piston top portion has a converging surface thereon contiguous with its top, for allowing the trapped water in said annular space around said piston top portion to be ejected upwardly between said converging neck and the converging surface on said piston top portion.

21. In a gun-type seismic energy source adapted to be submerged in a body of water wherein gas pressure in an operating chamber of the gun-type source is applied to a reciprocatable shuttle for holding the shuttle in an initial closed position for causing the shuttle to block access from a firing chamber to a discharge port for preventing the contents of said firing chamber from escaping through said discharge port, and wherein the holding action of the gas pressure is released from the shuttle by actuating means for permitting the sudden movement of the shuttle to an open position in which said firing chamber communicates with the discharge port for permitting the contents of said firing chamber suddenly to escape through said discharge port for generating seismic energy in the water, the invention comprising:

an elongated cylindrical member defining said firing chamber;

a freely movable piston follower in said cylindrical member dividing the firing member into a charge chamber which is located on the side of said piston follower facing toward the discharge port and a gas-propulsion chamber which is located on the opposite side of said piston follower;

said piston follower being freely movable upwardly in said cylindrical member to an upper position in which said charge chamber is reduced in volume relative to said gas-propulsion chamber and also being movable downwardly to a lower position in which said charge chamber is enlarged in volume relative to said gas-propulsion chamber;

means for supplying pressurized gas into said gas-propulsion chamber for moving said piston follower to said upper position;

said charge chamber having inlet means communicating therewith for feeding high pressure water into said charge chamber for filling said charge chamber with water and thereby driving said piston follower downwardly to said lower position for further compressing the pressurized gas in said gas-propulsion chamber;

whereby the compressed pressurized gas in said gas-propulsion chamber can suddenly expand for suddenly pushing the piston follower upwardly to said upper position upon release of said shuttle for forcefully propelling the water from said charge chamber out through said discharge port into the surrounding water for generating a powerful seismic impulse in the body of water; and said piston follower in said upper position preventing the expanded pressurized gas in said gas-propulsion chamber from flowing out through said discharge port.

* * * * *